No. 626,170. Patented May 30, 1899.
E. S. LAGERQUIST.
MILK STRAINER.
(Application filed Feb. 18, 1899.)
(No Model.) 2 Sheets—Sheet I.
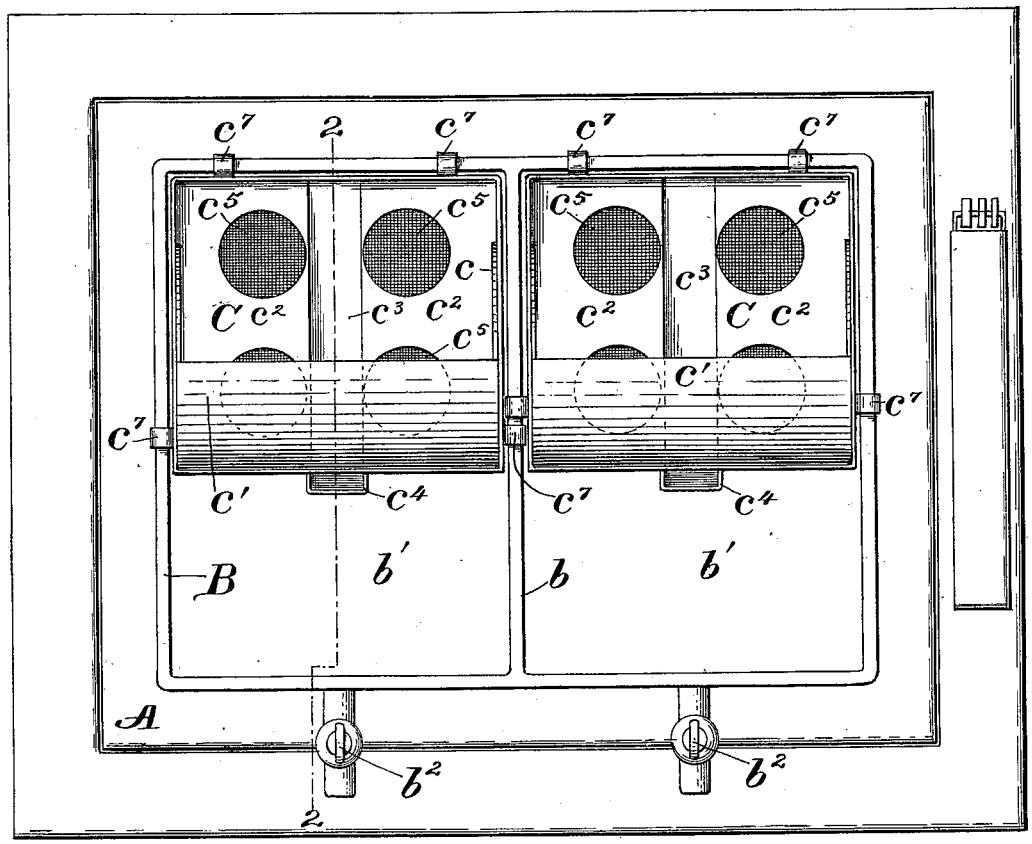
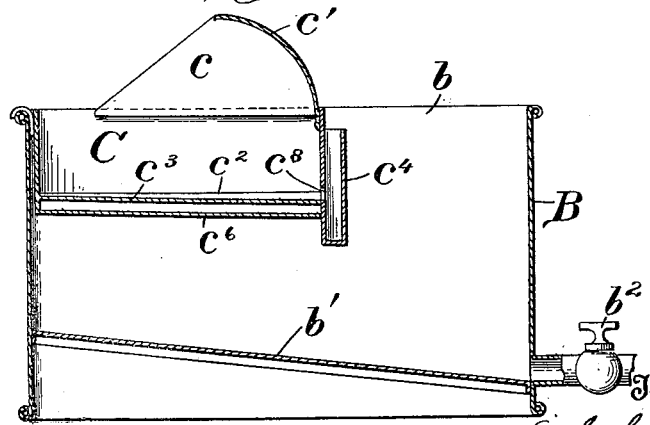
Witnesses
Jos. H. Blackwood
J. Stephen Kinsta
Inventor
E. S. Lagerquist
by Wilkinson & Fisher
Attorneys.

No. 626,170. Patented May 30, 1899.
E. S. LAGERQUIST.
MILK STRAINER.
(Application filed Feb. 18, 1899.)
(No Model.) 2 Sheets—Sheet 2.
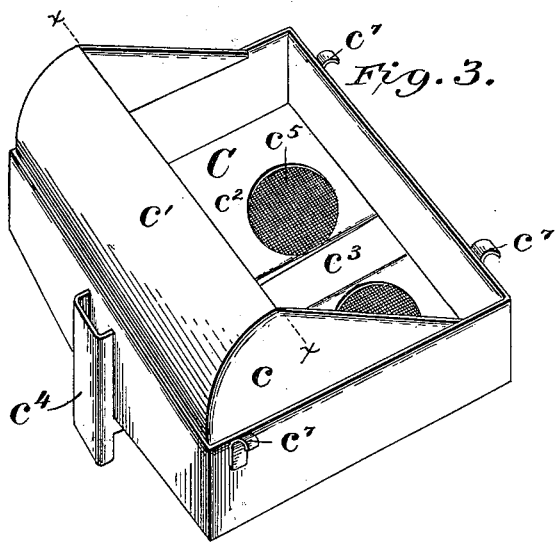
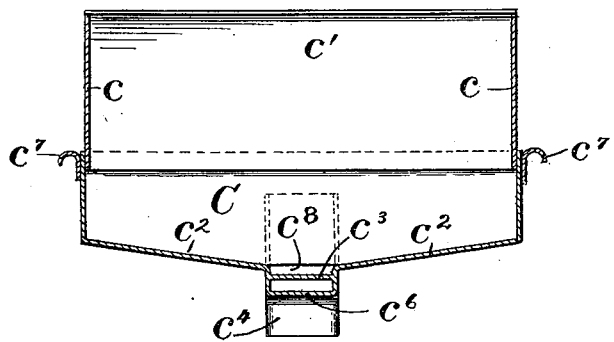
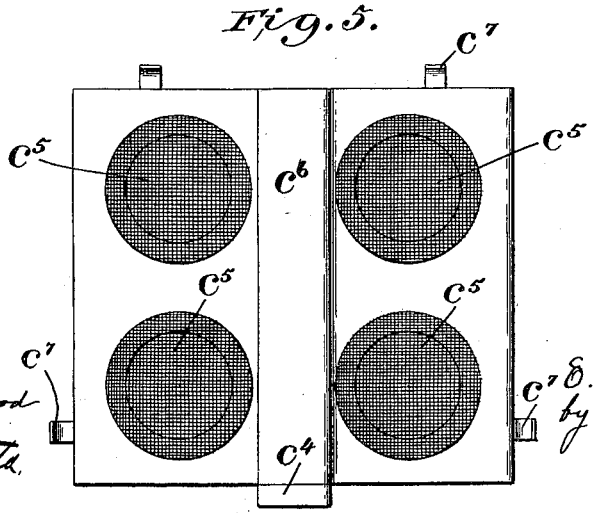
Witnesses
Jos. H. Blackwood
Stephen Siusta
Inventor.
E. S. Lagerquist.
by Wilkinson
& Fisher.
Attorneys.

UNITED STATES PATENT OFFICE.

ERIK S. LAGERQUIST, OF OXFORD DEPOT, NEW YORK.

MILK-STRAINER.

SPECIFICATION forming part of Letters Patent No. 626,170, dated May 30, 1899.

Application filed February 18, 1899. Serial No. 706,060. (No model.)

*To all whom it may concern:*

Be it known that I, ERIK S. LAGERQUIST, a citizen of the United States, residing at Oxford Depot, in the county of Orange and State of New York, have invented certain new and useful Improvements in Milk Strainers and Receivers; and I do hereby declare the following to be a full, clear, and exact description of the invention, such as will enable others skilled in the art to which it appertains to make and use the same.

My invention relates to improvements in strainers and receiving vessels therefor for the purposes of receiving, straining, weighing, and distributing milk and other fluids; and the object of my invention is to produce a compact, efficient, and cheap apparatus for accomplishing these results.

With this object in view my invention consists in the constructions and combinations of parts, as hereinafter described and claimed.

In the accompanying drawings, Figure 1 is a top plan view showing a scale-platform with my improved devices resting thereon. Fig. 2 is a cross-section of my improvement, taken on the line 2 2 of Fig. 1. Fig. 3 is a perspective view of the strainer. Fig. 4 is a cross-section of the same, taken on the line $x$ $x$ of Fig. 3; and Fig. 5 is a bottom plan view of the same.

A indicates a scale-platform, on which rests the receiving vessel B, which is provided with strainers C.

The receiving vessel A is made of tin or any other suitable material. It is shown as divided into two compartments by the partition $b$; but it is obvious that any number of compartments might be used. It is provided with an inclined bottom $b'$ and with a stop-cock $b^2$ at the lowest part of each compartment.

The strainer C is ordinarily made in the form of a square box, with wings $c$ on two of the sides thereof and a curved extension $c'$ projecting upwardly at the back of the strainer to prevent the milk from splashing over when it is poured into the strainer. The bottom $c^2$ of the strainer slopes downwardly from each side to the center, where a trough $c^3$ is formed, which is inclined downwardly from the front to the rear of the strainer, at which point it enters through an aperture $c^8$ a well $c^4$, the trough and well serving to collect any solid matter that the milk may contain.

Circular screens $c^5$, made of wire or other suitable material, cover holes cut in the bottom of the strainer. Four of these screens are shown in each strainer; but it is obvious that any desired number in each strainer may be used and that they may be of any desired shape.

A strengthening-rib $c^6$, just underneath the trough $c^3$, may be used, though it is not a necessary feature.

Clips $c^7$ are provided which are adapted to engage the upper edges of the vessel B and to suspend the strainer C therefrom.

The operation is as follows: The apparatus is placed on the scale-platform and balanced by weights. An additional weight is then placed on the scale-arm and milk or other fluid poured into the strainer until equilibrium is established. As soon as the operation of straining is completed the milk or other fluid is drawn off through the stop-cock $b^2$.

Having thus described my invention, what I claim as new, and desire to secure by Letters Patent of the United States, is—

1. In an apparatus for receiving and straining milk, a vessel provided with supports; an inclined bottom; a central inclined trough in said bottom extending at its lower end through the side wall of said vessel; screens in said bottom; and a well connected to the lower end of said inclined trough outside of the vessel and having a wall extending to or near the rim of the vessel, substantially as described.

2. In an apparatus for receiving and straining milk, a vessel consisting of a rectangular box with clips attached to the sides thereof; an inclined bottom; a central inclined trough in said bottom extending at its lower end through the side wall of said vessel; screens in said bottom; and a well connected to the lower end of said inclined trough outside of the vessel and having a wall extending to or near the rim of the vessel, substantially as described.

3. In an apparatus for receiving and straining milk, a vessel provided with supports; a hood upon the rear of said box having extensions upon two opposite sides thereof; an inclined bottom; a central inclined trough in said bottom extending at its lower end through the side wall of said vessel; screens in said bottom; and a well connected to the lower end of said inclined trough outside of the vessel and having a wall extending to or near the rim of the vessel, substantially as described.

In testimony whereof I affix my signature in presence of two witnesses.

ERIK S. LAGERQUIST.

Witnesses:
EDWARD J. COLLINS,
JOSEPH VAN CLEFT.